INVENTOR.
ELLWOOD F. RIESING
BY
ATTORNEYS

United States Patent Office 2,797,944
Patented July 2, 1957

2,797,944
FLUID SEAL

Ellwood F. Riesing, Dayton, Ohio, assignor to General Motors Corporation, Detroit, Mich., a corporation of Delaware Application December 5, 1952, Serial No. 324,324

4 Claims. (Cl. 288—2)

This invention relates to fluid seals and is particularly concerned with fluid seals of the radial type.

It is an object of the invention to provide a fluid seal for use in connection with a rotating member wherein the seal is held within a cavity of a housing member and seals peripherally around the rotating member and wherein a reinforcing element is provided within the seal for maintaining its shape and its sealing efficiency.

In carrying out the above object, it is a further object of the invention to provide a radial seal preferably of the garter spring type having a reinforcing member embedded and mounted therein, said reinforcing member having a truncated conical shape whereby the largest diameter portion of the truncated conical reinforcing member is spaced adjacent the housing into which the seal is to be inserted and wherein the outer surface of the seal in its free position is always out of parallelism with the reinforcing member whereby movement or flow of the seal material occurs during insertion for improving the sealing characteristics of the assembly.

A still further object of the invention is to position the frusto-conical reinforcing member within the sealing assembly so that it is always out of contact with the housing into which the seal is to be positioned, this being accomplished by forming the outer surface of the seal so as to require compression as the seal is inserted in the housing for moving the reinforcing member away from the housing, thereby providing for elastomeric material being between the reinforcing member and the housing. This condition results in a reduction in permanent compression set conditions whereby the seal remains in good sealing contact with the housing over extended periods of time.

Further objects and advantages of the present invention will be apparent from the following description, reference being had to the accompanying drawings, wherein preferred embodiments of the present invention are clearly shown.

Seals of the radial type are frequently used for sealing oil and grease, for example, in axle housings. In these installations, the sealing member is forced into an axle housing while the peripheral sealing lip of the device engages the axle which rotates therethrough. The sealing lip is generally held in sealing engagement with the axle through its inherent resiliency and through the use of a garter type spring.

In many instances, these seals are forced into the housing on a pilot rod and are positioned against a shoulder in the housing. In other instances, no shoulders are used and the seal is held within the housing due to radial compression thereof caused by the predetermined diameter of the seal with respect to the housing.

In all of these installations, it is desirable to have a sealing member which has a degree of resiliency to permit radial compression thereof but which has sufficient rigidity to prevent excessive distortion of the seal. This is accomplished by the use of a reinforcing member surrounding or mounted in the sealing structure, which member is generally metal. This member is in a form of an annular ring or, in some cases, a flanged ring and generally has its outer face in parallelism with the housing. Furthermore, when an embedded reinforcing member is used, it is necessary to locate it in the elastomeric compound in close proximity to the outer periphery thereof since this reinforcing member must be positioned within the mold in a central location and in order to accomplish this positioning, it is necessary to have portions of the reinforcing member in contact with the mold. For these reasons only, a very thin covering of elastomeric compound is generally present over the outer surface of the reinforcing member.

It has been found that this rather thin covering of elastomeric compound over the reinforcing member loses resiliency and takes a permanent compression set after installation, which eventually, through vibration of the equipment in which the seal is provided, causes the seal to become loose in its housing. Furthermore, seals of this character wherein the reinforcing member is closely adjacent the outer diameter of the seal are very difficult to install due to the low degree of resiliency of the thin covering of the elastomer. Thus when the seal is being pressed into the housing, the elastomeric covering is often scraped off the reinforcing member, making it necessary to replace the entire seal assembly.

I have found that by using a frusto-conical reinforcing member, the disadvantages of the past seals may be largely eliminated while all of the end advantages may be utilized and in fact wherein the utility of the seal is actually enhanced.

Figure 1:
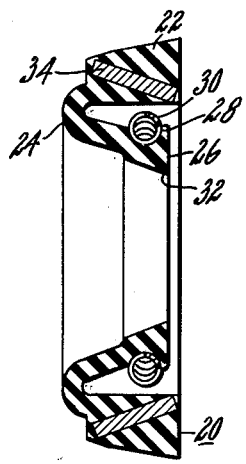
Fig. 1 is a view in cross section of a seal of the type described herein.

Referring to Fig. 1, one embodiment of my improved seal is shown at 20. This includes an annular ring or body portion 22 having a reduced thickness bellows portion 24 of annular shape which is curved inwardly within the annular portion 22. The bellows portion 24 has a relatively thicker ring-like member 26 in the inner end thereof which includes an outer annular groove 28 adapted to receive a garter spring 30 and an inner annular sealing lip 32 adapted to encircle and embrace a shaft. Within the portion 22 of the seal is embedded a reinforcing member 34 which is formed of metal in a frusto-conical shape. This member has its greatest diameter portion adjacent the smallest diameter portion of the annular body 22 and has its smallest diameter portion adjacent the internal diameter of the largest diameter portion of the annular body 22.

Figure 2:
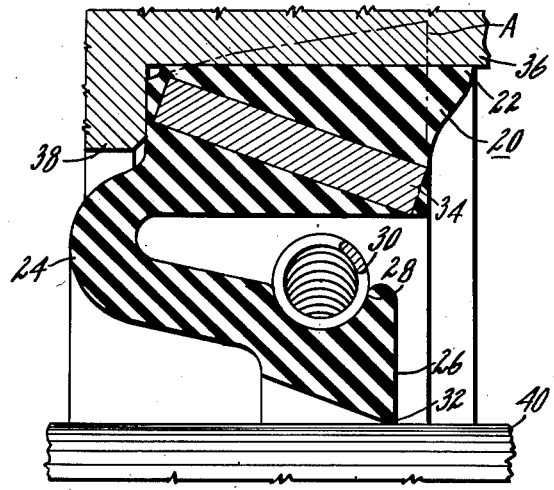
Fig. 2 is an enlarged, fragmentary view showing one-half of the seal depicted in Fig. 1 as it appears when installed within a housing and bearing against a shaft.

The free shape of the outer surface of the body 22 is shown in dotted lines in Fig. 2 as noted at A and the general shape of the seal 22, when inserted in the housing 36, is also shown in Fig. 2. The housing 36 includes a shoulder 38 in the bore thereof against which the inner face of the body 22 abuts and the sealing lip 32 is shown in contact with a shaft 40. It will be apparent that when the seal is forced into the housing 36 so that its inner end is abutting the shoulder 38, the free shape of the portion 22 is changed by compression. In this position the frusto-conical reinforcing element or ring 34 maintains the dimensions of the seal with respect to the housing so that the sealing lip is not, in any way, deformed and simultaneously the elastomeric body of the seal, as shown at 22, is deformed outwardly of the reinforcing member 34 to form a tight fluid seal with the housing wall wherein the body 22 is sufficiently thick to resist permanent compression set. In this manner, the seal is maintained in a tight sealing relation with the housing over long periods of time.

Figure 3:
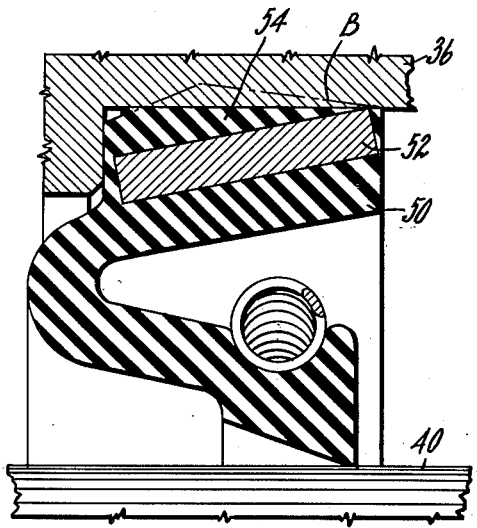
Fig. 3 is a view of another embodiment of the invention wherein the free position of elastomeric portion of the seal is shown in dotted lines.

Fig. 3 shows another embodiment of this invention wherein a seal, quite similar to that shown at 20, includes a frusto-conical ring 52 which is reversed in direction from the ring 34 used in connection with the seal 20. Here again, the free shape of the elastomeric portion 54 of the seal is shown in dotted lines at B and is obviously compressed considerably as it is installed in the housing 36. In this instance, appreciable thickness of elastomer is present at all times between the frusto-conical reinforcing member and the housing, but, as in the case of Fig. 1, the locating of the seal is maintained accurate by the edge of the frusto-conical ring 52 which is closely adjacent to the housing wall 50.

Figure 4:
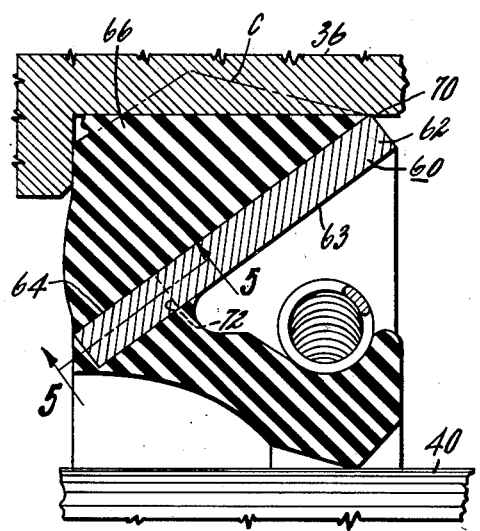
Fig. 4 is a view of another embodiment of a seal wherein the free position of the elastomeric portion thereof is shown in dotted lines.

Fig. 4 shows still another embodiment of the same general type of seal at 60. In this instance, a frusto-conical ring 62 is used which is positioned upon an inner surface of a mold during the manufacture of the article and which is exposed at 63 and bonded to the elastomer of the remainder of the seal along the surface 64. The elastomer in the portion 66 of this seal has a free shape as shown in dotted lines at C and again is held under high compression when installed, although the entire seal 60 is accurately positioned by the edge noted at 70 which centrally locates the seal with respect to the shaft 40. The frusto-conical ring 62 is preferably made with a plurality of equally spaced cut-outs 72 around its smallest diameter portion to permit free flow of elastomer therethrough during the molding operation.

Figure 5:
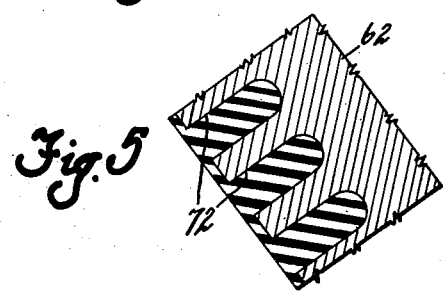
Fig. 5 is a sectional view taken on line 5—5 of Fig. 4.

In all of the seals, it will be noted that the free shape of the outer periphery thereof as shown in dotted lines at A in Fig. 2, B in Fig. 3, and C in Fig. 4, is such that the entry of the seal into the housing 36 is facilitated by the chamfered corner which in all cases is of a smaller diameter than the inner diameter of the housing. This permits the seal to be entered into the housing and then pressed inwardly by the pressure applied from the pilot or other tool against the outer edge of the seal as backed up by the frusto-conical reinforcing member. In each and every case, the frusto-conical reinforcing member has a portion sufficiently close to the outer surface of the seal to be effective as a locator for centrally disposing the seal with respect to the shaft and in each and every case, the outer diameter of the seal includes sufficient elastomeric compound to resist permanent compression set during use whereby the seal is maintained effective over long periods of time. Furthermore, the permanent compression set is reduced due to the free deflection of the elastomer which is capable of moving along the wall of the housing to effect the desired sealing action. In place of the cutouts 72 as shown in Fig. 5, these cutouts may take the form of holes or openings in the body of the conical member 60 or may involve the use of cutout portions adjacent the large diameter end of the conical member 60. The latter arrangement is advantageous in that it permits an inward flexing of the spring-like separations between the cutouts 72 to increase the grip of the seal in the housing. The term "aperture" as used in this specification and the claims is intended to describe generically the aforementioned holes, openings and cutouts.

In all cases, the elastomeric portion of the seal may be formed from any suitable elastomeric compound and is preferably formed from one of the copolymers of butadiene-acrylonitrile or polychloroprene, although it is apparent that where the application permits, this material may be butadiene-styrene copolymer, natural rubber, vinyl materials or compatible combinations of any of the above. In other words, the particular material of the elastomeric portion of the seal forms no part of the invention and may consist of any suitable elastomeric material which is readily bonded to metal and which is resistant to the materials being sealed.

While the embodiments of the present invention as herein disclosed, constitute preferred forms, it is to be understood that other forms might be adopted.

What is claimed is as follows:

1. A fluid seal of the radial type adapted to be interposed between a housing member and a shaft, comprising in combination; an elastomeric body member having a free shape including an outer diameter approximately equal to the bore diameter of the housing and an outer diameter substantially greater than the bore diameter of the housing, an annular radial sealing ring including a lip thereon adapted to seal against the shaft, a flexible annular diaphragm portion connecting the body member and the sealing ring and integrally formed therewith, a spring surrounding the sealing lip, a substantially rigid reinforcing member of frusto-conical shape embedded in the body portion, said reinforcing member having its greatest diameter adjacent the outer diameter of said body which in a free state is approximately equal to the bore diameter of said housing whereby said reinforcing member aids in locating the seal in the housing on insertion of the seal therein, said reinforcing member having its smallest diameter portion adjacent the inner diameter of said body whereby a relatively large mass of elastomer is positioned in compression between said frusto-conical reinforcing member and said housing.

2. A fluid seal of the radial type adapted to be interposed between a housing member and a shaft, comprising in combination; an annular elastomeric body portion having a free shape including an outer diameter approximately equal to the bore diameter of the housing and an outer diameter substantially greater than the bore diameter of the housing, an annular resilient sealing ring including a lip thereon adapted to seal against a shaft, a flexible diaphragm portion connecting the body portion and the sealing ring and integrally formed therewith, and a substantially rigid reinforcing member of frusto-conical shape embedded in the body portion, said reinforcing member having a plurality of apertures therethrough, said elastomeric body portion filling said apertures, said reinforcing member having its greatest diameter adjacent said outer diameter of said body portion which in a free state is approximately equal to the bore diameter of said housing whereby said reinforcing member aids in locating the seal in the housing on insertion of the seal therein, said reinforcing member extending axially across said seal body to back up and support the greatest diameter portion of said seal body in compression against said housing.

3. A fluid seal of the radial type adapted to be interposed between first and second relatively rotatable members, comprising in combination, an annular elastomeric body portion having a free shape including a diameter approximately equal to the diameter of said first member and having a substantial enlarged portion extending in the direction of said first member whereby a substantial mass of rubber is placed under compression when the seal is interposed between the relatively rotatable members, a sealing ring portion adapted to slidingly engage said second member, a flexible annular diaphragm portion connecting the body portion to the sealing ring portion and being integrally formed therewith, a rigid frusto-conical reinforcing member having a largest and smallest diameter embedded in said body portion, one of said reinforcing member diameters being adjacent the surface of said body portion which is approximately equal to the diameter of said first member whereby the reinforcing member aids in locating the seal relative thereto, the other of said reinforcing member diameters being displaced axially of said first mentioned reinforcing ring diameter whereby the frusto-conical reinforcing member supports said enlarged body portion in compression against said first relatively rotatable member and prevents distortion of the portion of said body portion carrying said diaphragm.

4. A fluid seal of the radial type adapted to be interposed between a housing member and a shaft, comprising in combination; an annular elastomeric body portion having a free shape including an outer diameter approximately equal to the bore diameter of the housing and an outer diameter substantially greater than the bore diameter of the housing, an annular resilient sealing ring including a lip thereon adapted to slidingly engage a shaft, a flexible diaphragm portion connecting the body portion and the sealing ring and being integrally formed therewith, and a substantially rigid reinforcing member of frusto-conical shape embedded in the body portion, said reinforcing member having its greatest diameter adjacent said outer diameter of said body portion which in a free state is approximately equal to the bore diameter of said housing whereby said reinforcing member aids in locating the seal in the housing on insertion of the seal therein, said reinforcing member extending substantially across the axial length of said body portion whereby the frusto-conical reinforcing member backs up and supports a substantial mass of elastomeric material against said housing in compression and prevents distortion of the portion of said body portion carrying said diaphragm.

References Cited in the file of this patent

UNITED STATES PATENTS

| | | |
|---|---|---|
| 2,310,607 | Batesole | Feb. 9, 1943 |
| 2,417,390 | Winkeljohn | Mar. 11, 1947 |
| 2,437,901 | Winkeljohn | Mar. 16, 1948 |
| 2,467,210 | Helfrecht | Apr. 12, 1949 |
| 2,587,405 | Stevens et al. | Feb. 26, 1952 |
| 2,672,359 | Fisher et al. | Mar. 16, 1954 |
| 2,697,623 | Mosher | Dec. 21, 1954 |
| 2,736,584 | Riesing | Feb. 28, 1956 |
| 2,736,586 | Riesing | Feb. 28, 1956 |

FOREIGN PATENTS

| | | |
|---|---|---|
| 511,895 | Belgium | June 30, 1952 |
| 541,336 | Great Britain | Nov. 24, 1941 |